April 30, 1957   M. B. RIGGS   2,790,482
METHOD OF MAKING NYLON TIRES
Filed Jan. 13, 1955
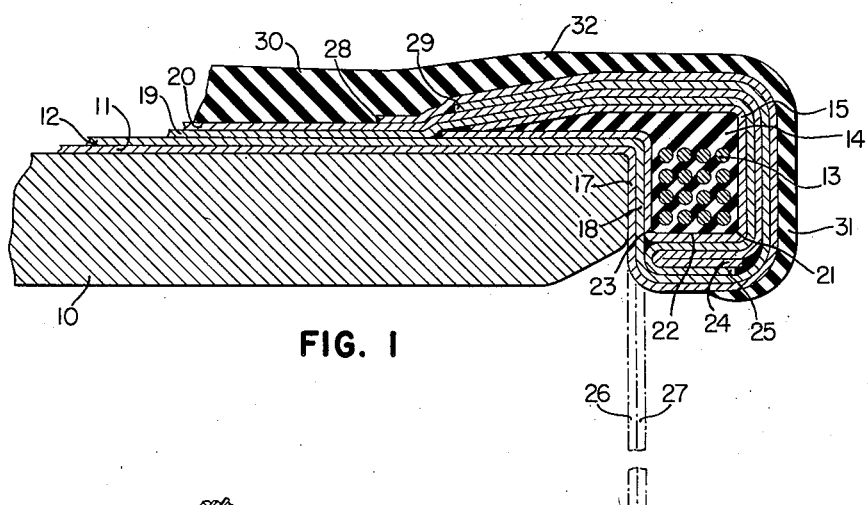
FIG. 1
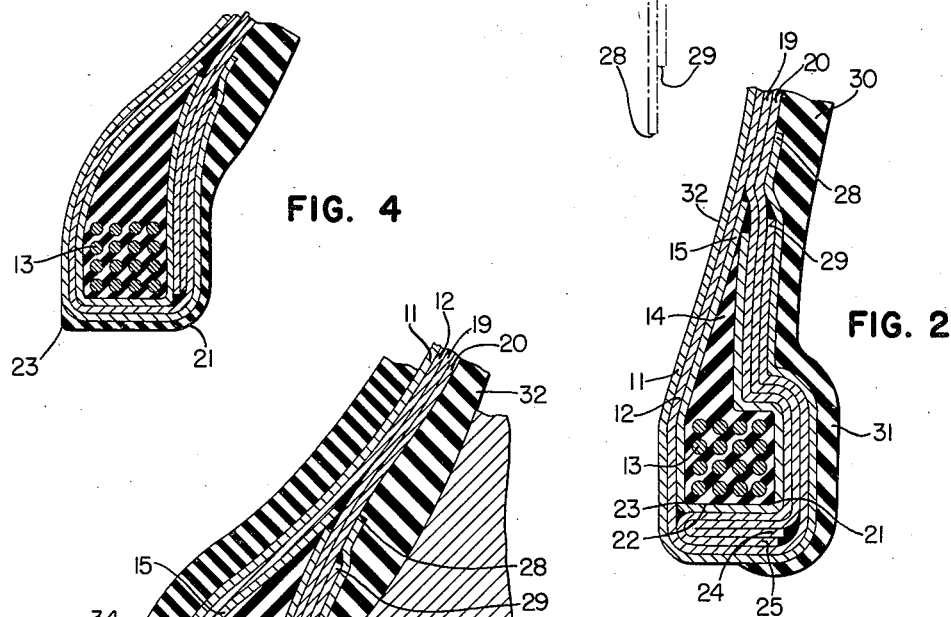
FIG. 4
FIG. 2
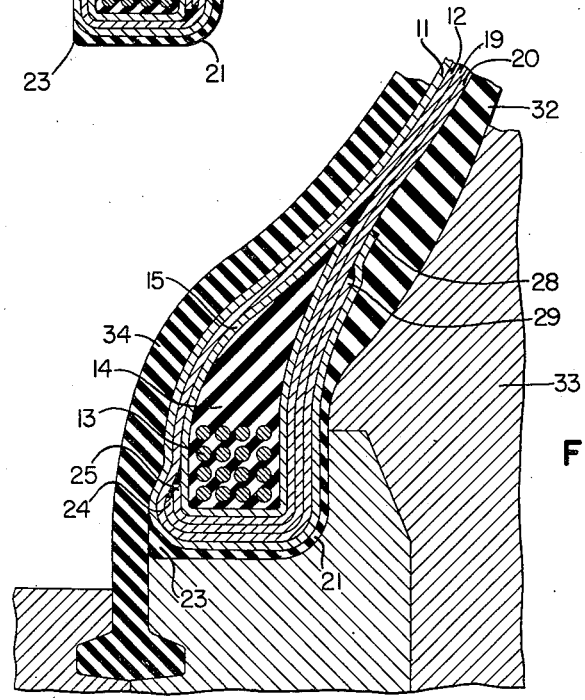
FIG. 3
*INVENTOR.*
MART B. RIGGS
BY
*R. L. Miller*
ATTORNEY United States Patent Office 2,790,482
Patented Apr. 30, 1957

2,790,482

METHOD OF MAKING NYLON TIRES

Mart B. Riggs, Akron, Ohio, assignor to The Goodyear Tire & Rubber Company, Akron, Ohio, a corporation of Ohio Application January 13, 1955, Serial No. 481,627

6 Claims. (Cl. 154—14)

This invention relates to the manufacture of pneumatic tires, and more particularly to the process of manufacturing tires having reinforcing fabric plies made of nylon or other synthetic heat-shrinkable material embedded therein.

Heretofore, tires have been built by the so-called flat band process wherein ply material, consisting of diagonally disposed parallel cords embedded in sheet rubber, is wrapped or placed about a substantially cylindrical drum, or building form, and the circumferential marginal edges of the ply material are folded radially inward over the edges of the drum. Circular inextensible beads are placed against the inturned edges of the ply material and additional outer plies of material are then placed or wrapped about the first layer or layers of ply material on the drum to build up the body of the tire in a laminated construction. The circumferential marginal edges of the outer layer or layers of ply material are then folded about the beads terminating at the toe thereof. Thereafter, the inner ply or plies of material are wrapped about the beads as well as the inturned edges of the outer plies so as to retain the latter in place.

With the advent of nylon as a ply material, considerable difficulty has been encountered with tires built in the manner described above because as the tire is cured the nylon cords shrink so that the turned circumferential marginal edges of the outer plies which terminate in the area of the toe of the bead are pulled toward the heel of the bead and after cure are disposed in the area of the heel so that very little snub or bite around the beads remains in the outer plies. As a result of the short turn or limited amount of snub, the outer plies tend to pull out of compression in the base of the bead and considerably lessens the strength of the tire.

The principal object of this invention is, therefore, to provide an improved method of manufacturing pneumatic tires having nylon or other heat-shrinkable reinforcing material embedded in the tire carcass which method compensates for the shrinkage of nylon during the curing operation of the tire so that the ends of the outer reinforcing plies terminate in the toe of the bead after cure, rather than in the heel of the bead.

Another object of this invention is to provide a method of making nylon tires, including the step of folding back the circumferential marginal edges of the outer plies toward the inner plies whereby the relative number of the outer and inner plies due to shrinkage of the nylon during cure, unfolds the folded circumferential marginal edges of the outer ply so that the edges terminate in the area of the toe rather than in the heel of the bead after the curing operation.

Fig. 1 is a partial cross-sectional view of a tire built according to the present invention mounted on a building drum.

Fig. 2 is a partial cross-sectional view through the bead of a tire constructed according to the present invention and showing the relative position of the turned plies after shaping but prior to the curing operation.

Fig. 3 is a cross-sectional view similar to Fig. 2 showing the relative position of the ply endings after the curing operation.

Fig. 4 is a cross-sectional view similar to Fig. 3 showing the relative position of the ply endings after cure of a nylon tire constructed according to conventional methods.

Referring to Fig. 1 of the drawings, numeral 10 refers to a tire building drum of a tire machine having conventional construction such as shown in U. S. Patent 2,313,035, and upon which the method of this invention may be practiced. Inner plies 11 and 12 are wrapped or placed about the substantially cylindrical outer surface of the drum 10 and the circumferential marginal edges of the inner plies 11 and 12 are folded radially inward over the ends of the drum 10 into the position shown in dotted lines in Fig. 1. Circular inextensible beads 13 which are embedded in a body of rubber 14 and wrapped with a flipper 15 are placed against the inturned edges 17 and 18 of the inner plies 11 and 12. Additional ply material 19 and 20 is then placed or wrapped about the inner plies 11 and 12 on the drum 10 to build up the body of the tire in a laminated construction. The outer plies 19 and 20 are then wrapped about the heel 21 of the bead 13. From the heel 21, the plies 19 and 20 extend parallel to the base 22 of the bead 13 to the toe 23 of the bead 13. The circumferential marginal edges 24 and 25 of the plies 19 and 20 respectively are then folded back in a direction away from or radially inward of the bead toward the heel 21, forming a lap in the base 22 of the bead extending from the toe 23 to the heel 21 thereof.

After the outer plies have been turned down and lapped or folded back as described above, the circumferential marignal edge portions 26 and 27 of the inner plies 11 and 12 respectively are turned up outwardly of the plies 19 and 20 so as to completely surround the lapped edges of the outer plies 19 and 20 and the entire periphery of the bead 13. The circumferential marginal edges 28 and 29 of the inner plies 11 and 12, therefore, terminate a substantial distance above the bead 13 and outwardly of the plies 19 and 20. After the plies 11 and 12 have been turned up into the position shown in Fig. 1, the tread ply 30 is wrapped about the reinforcing material and the circumferential marginal edges 31 are turned down so as to cover the turned up marginal edge portions 26 and 27 of the inner plies 11 and 12.

In accordance with conventional practice the green tire built on the drum 10 in the manner described above and generally referred to by the numeral 32 is formed into a toroidal shape as shown in Fig. 2 and placed within a curing mold 33 having a curing bag 34 shown in Fig. 3. The green tire 32 is then subjected to sufficient heat and pressure to cure the rubber. The curing temperature is, according to conventional practice, generally above 200° F. and it is well known that nylon when heated above 200° F. will shrink to a considerable extent. In fact nylon reinforcing cord plies in tires, constructed according to conventional practice wherein the circumferential marginal edges of the outer plies terminate in the toe of the bead prior to cure, will shrink so that after cure the marignal edges of the plies are disposed within the heel portion of the tire as shown in Fig. 4.

During the curing operation of tires constructed according to the present invention, all of the nylon reinforcing plies shrink or become shortened in length. The circumferential marginal edge portions 26 and 27 of the inner plies 11 and 12 tend to move in the bead area in a direction from the heel 21 toward the toe 23. Conversely, the nylon material of the outer plies 19 and 20 in the area of the bead base 22 tend to move from the toe 23 to the heel 21 thereof. Shrinkage of the inner plies 11 and 12 in the direction indicated above tends to move the circumferential marginal edges 24 and 25 of the outer plies toward the toe of the bead and shrinkage of the outer plies 19 and 20 in the area of the bead base 22 in the direction indicated above removes the slack formed in the base of the bead so that the folded back circumferential marginal edges 24 and 25 of the outer plies 19 and 20 are unfolded by the relative movement of the plies into the position shown in Fig. 3. After cure the circumferential marginal edges 24 and 25 are situated in the toe area 23 of the bead rather than the heel 21 thereof so that a substantial snub or bite of the outer plies 11 and 12 around the bead 22 is provided which considerably strengthens the tire.

The invention has been explained in connection with a tire having plies reinforced with nylon but obviously, other material which is shrinkable at the temperature of tire vulcanization may be used as reinforcement if otherwise found satisfactory, for example, polyethylene terephthalate fiber known commercially as Dacron or Terylene and described in British Patent 578,079.

Although the description of the invention has been made in connection with a tire having four layers or plies or reinforcing material, it is contemplated that tires of a greater or lesser number of plies may be built by this method, and while certain representative embodiments and details have been shown for the purpose of illustrating the invention, it will be apparent to those skilled in this art that various changes and modifications may be made therein without departing from the spirit or scope of the invention.

I claim:

1. A method of building tires of nylon fabric reinforced rubber-like material terminating in bead portions having bead rings therein, comprising assembling a plurality of inner and outer reinforcing plies of nylon reinforced rubber-like ply material extending continuously from bead to bead with the ends of the outer reinforcing plies partially wrapped around said bead rings and lapped back on itself at the base of the bead, wrapping the ends of the inner reinforcing plies around said bead rings outwardly of said outer plies, and curing the tire under heat whereby shrinkage of the nylon during cure causes the lap portion of said outer plies to unfold so that the marginal edges of the outer reinforcing plies are disposed in the toe area of the bead.

2. A method of building tires according to claim 1 in which the ends of the inner reinforcing ply are lapped a distance substantially equal to the distance from the toe to the heel of the bead.

3. A method of building tires according to claim 1 in which the lapped ends of the inner reinforcing ply are folded back in a direction away from the bead and the ends of the inner reinforcing plies terminate in the heel portion of the bead.

4. A method of building tires according to claim 1 in which the lapped ends of the outer reinforcing plies are folded in the same direction and the outer surface of the outermost reinforcing ply of said outer plies is folded upon itself.

5. In the method of building a pneumatic tire of nylon fabric reinforcing rubber-like material which comprises wrapping first reinforcing plies of nylon reinforced rubber-like material around a cylindrical building drum, forming annular inextensible beads, wrapping second reinforcing plies of nylon reinforced rubber-like material around the first plies, wrapping the circumferential marginal edges of the second plies around said bead, wrapping the circumferential marginal edges of said first plies around said beads outwardly of the circumferential marginal edges of said second plies, and curing the tire so built, the improvement which comprises folding the circumferential marginal edges of the first plies back upon themselves to form a lapped edge in the base of the bead in a direction toward but inwardly of the second plies, whereby shrinkage of the nylon during cure causes the lapped edges of said first plies to unfold.

6. A method as claimed in claim 5 in which the lap of the circumferential marginal edges of the first plies extend from approximately the toe of the bead to approximately the heel of the bead.

References Cited in the file of this patent
UNITED STATES PATENTS 2,592,844　　Antonson　＿＿＿＿＿＿＿＿＿＿＿＿＿ Apr. 15, 1952